(12) United States Patent
Mao et al.

(10) Patent No.: US 7,809,239 B2
(45) Date of Patent: Oct. 5, 2010

(54) ELECTRIC APPLIANCE SYSTEM HAVING SELECTABLE USER INTERFACES AND METHOD FOR CONTROLLING THE SAME

(75) Inventors: Lu-Kang Mao, Hsinchu (TW); Yu-Lin Chu, Hsinchu (TW); Chung-Ching Huang, Hsinchu (TW)

(73) Assignee: Lite-On-It Corp., Taipei (TW)

( * ) Notice: Subject to any disclaimer, the term of this patent is extended or adjusted under 35 U.S.C. 154(b) by 1367 days.

(21) Appl. No.: 11/268,009

(22) Filed: Nov. 7, 2005

(65) Prior Publication Data

US 2006/0103625 A1    May 18, 2006

(30) Foreign Application Priority Data

Nov. 12, 2004   (TW) .............................. 93134770 A

(51) Int. Cl.
*H04N 5/76* (2006.01)

(52) U.S. Cl. ........................................ 386/46; 386/125

(58) Field of Classification Search .................... 386/1, 386/45–46, 83, 125–126; 725/817–820, 725/828–829; 345/902
See application file for complete search history.

(56) References Cited

U.S. PATENT DOCUMENTS 6,437,836 B1 * 8/2002 Huang et al. ................ 348/734
2002/0174430 A1 * 11/2002 Ellis et al. ..................... 725/46

* cited by examiner

*Primary Examiner*—Thai Tran
*Assistant Examiner*—Nigar Chowdhury
(74) *Attorney, Agent, or Firm*—Kirton & McConkie; Evan R. Witt

(57) ABSTRACT

In an electric appliance system, an electric appliance for performing designated functions and first and second remote controllers are included. The first remote controller is optionally triggered for controlling a first group of the designated functions, and the second remote controller is optionally triggered for controlling a second group of the designated functions. The second group includes at least one designated function included in the first group and at least one designated function excluded from the first group.

5 Claims, 5 Drawing Sheets

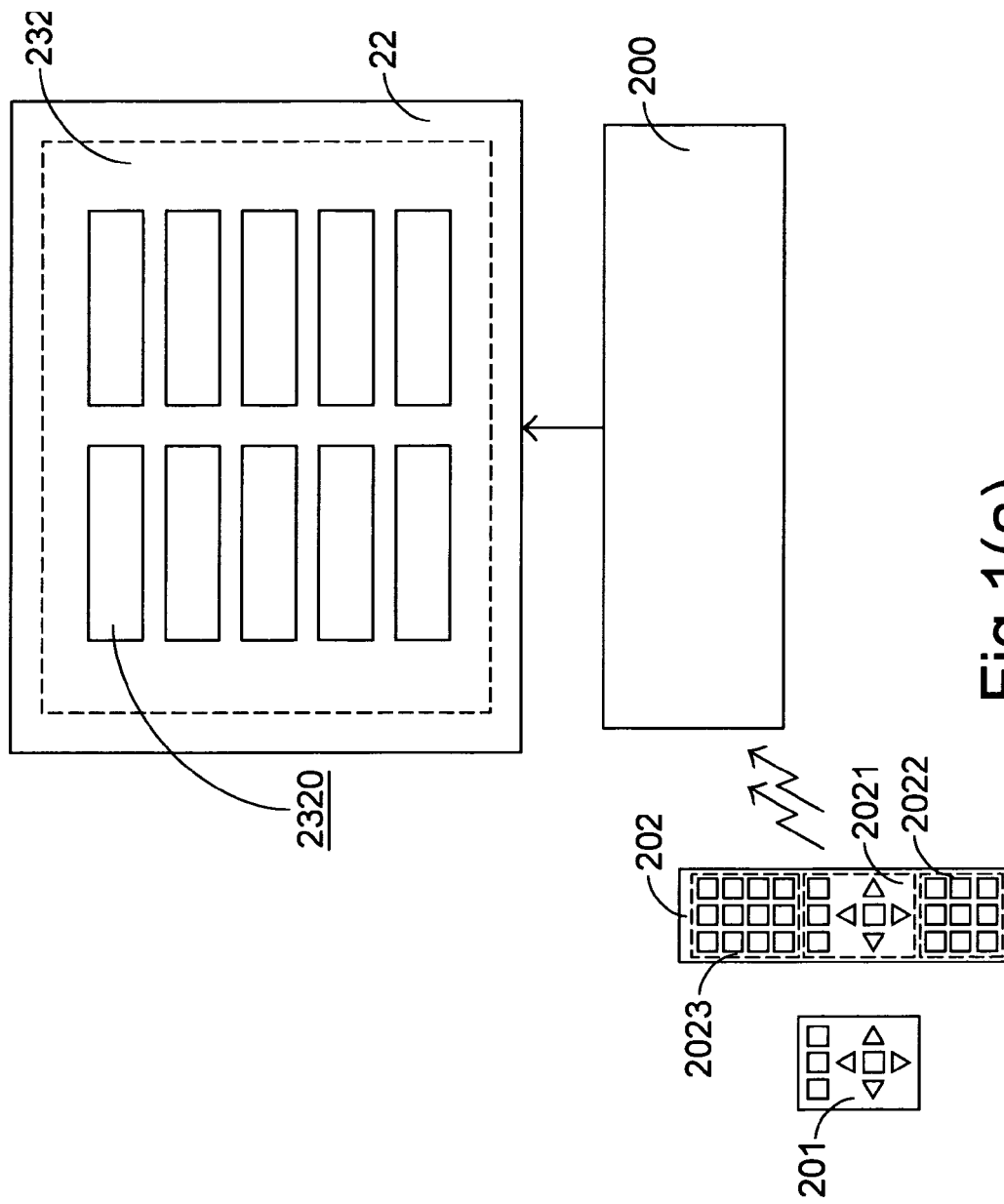

ELECTRIC APPLIANCE SYSTEM HAVING SELECTABLE USER INTERFACES AND METHOD FOR CONTROLLING THE SAME

FIELD OF THE INVENTION

The present invention relates to a method for controlling an electric appliance, and more particularly to a method for controlling an electric appliance through selectable multiple user interfaces. The present invention also relates to the electric appliance system having selectable multiple user interfaces.

Generally, a household electric appliance has only one kind of control interface, e.g. a single remote controller. Some electronic appliances, e.g. a DVD player/recorder/rewriter (digital versatile disc player, recorder or rewriter), have their control interfaces cooperate with graphics guiding menus shown on a screen for facilitating users' operations. The guiding menus correspond to the triggered buttons of the control interface, and are displayed in a fixed format with fixed contents. As the functions of the appliances increase, the control interface and the graphics guiding menus become more and more complicated. For example, the huge number and complicated arrangement of buttons on a remote controller often confuse the users, particularly the elder people and children.

Moreover, there might be some functions of the machine or some contents of discs that the parents would not like their children to access. The arbitrary triggering of the complicated buttons may lead to undesired revelation.

SUMMARY OF THE INVENTION

Therefore, the present invention provides a method for adaptive control of an electric appliance in consideration of different needs or different users.

The present invention also provides an electric appliance system operable with multiple user interfaces so that the electric appliance can be selectively controlled in consideration of different needs or different users.

The present invention further provides a method for controlling an electric appliance that is able to protect some functions of the electric appliance from being arbitrarily activated or prevent some information from being arbitrarily revealed.

In an electric appliance system according to the present invention, an electric appliance for performing designated functions and first and second remote controllers are included. The first remote controller is optionally triggered for controlling a first group of the designated functions, and the second remote controller is optionally triggered for controlling a second group of the designated functions. The second group includes at least one designated function included in the first group and at least one designated function excluded from the first group.

For facilitating users' operations or for some specific uses, the electric appliance system further includes a display in communication with the electric appliance. Then, a first graphics guiding menu can be shown on the display in response to a first command issued from the first remote controller, and a second graphics guiding menu can be shown on the display in response to a second command issued from the second remote controller, wherein the second graphics guiding menu includes at least one selective item included in the first graphics guiding menu and at least one selective item excluded from the first graphics guiding menu.

In a specific embodiment, the second group includes all designated functions in the first group, and the second graphics guiding menu includes all selective items in the first graphics guiding menu. Under this circumstance, the second remote controller may include more buttons than the first remote controller.

Despite the first command and the second command may control the same designated function, they are differentially encoded so as to show different graphics guiding menus.

For example, the electric appliance system can be a DVD player/recorder/rewriter.

According to another aspect of the present invention, for controlling a DVD player/recorder/rewriter, whether the DVD player/recorder/rewriter is under a controlled mode or a normal mode is determined. A controlled mode is determined when a first command is received from a user. In the controlled mode, a first graphics guiding menu is provided for performing a first group of designated functions. On the other hand, a normal mode is determined when a second command is received from a user. In the normal mode, a second graphics guiding menu is provided for performing a second group of designated functions. The second graphics guiding menu includes at least one selective item included in the first graphics guiding menu and at least one selective item excluded from the first graphics guiding menu. Then, the first graphics guiding menu or the second graphics guiding menu is operated to perform the first group of designated functions or the second group of designated functions. For example, the first command can be issued by triggering a first remote controller and the second command is issued by triggering a second remote controller, and the first command and the second command are differentially encoded when controlling the same function.

According to a further aspect of the present invention, for controlling a DVD player/recorder/rewriter, an identifying code received from a user is discriminated to be valid or not. A normal mode is determined when the identifying code is valid, and a controlled mode is determined when the identifying code is invalid or the input of the identifying code is incomplete. A first graphics guiding menu is provided for performing a first group of designated functions in the controlled mode, and a second graphics guiding menu is provided for performing a second group of designated functions in the normal mode. The second graphics guiding menu includes at least one selective item included in the first graphics guiding menu and at least one selective item excluded from the first graphics guiding menu. Then, the first graphics guiding menu or the second graphics guiding menu is operated to perform the first group of designated functions or the second group of designated functions. For example, the identifying code can be a password inputted via a remote controller.

BRIEF DESCRIPTION OF THE DRAWINGS

The above objects and advantages of the present invention will become more readily apparent to those ordinarily skilled in the art after reviewing the following detailed description and accompanying drawings, in which:

FIGS. 1(a) and 1(b) are schematic diagrams showing an embodiment of an electric appliance system according to the present invention;

DETAILED DESCRIPTION OF PREFERRED EMBODIMENTS

Figure 1B:
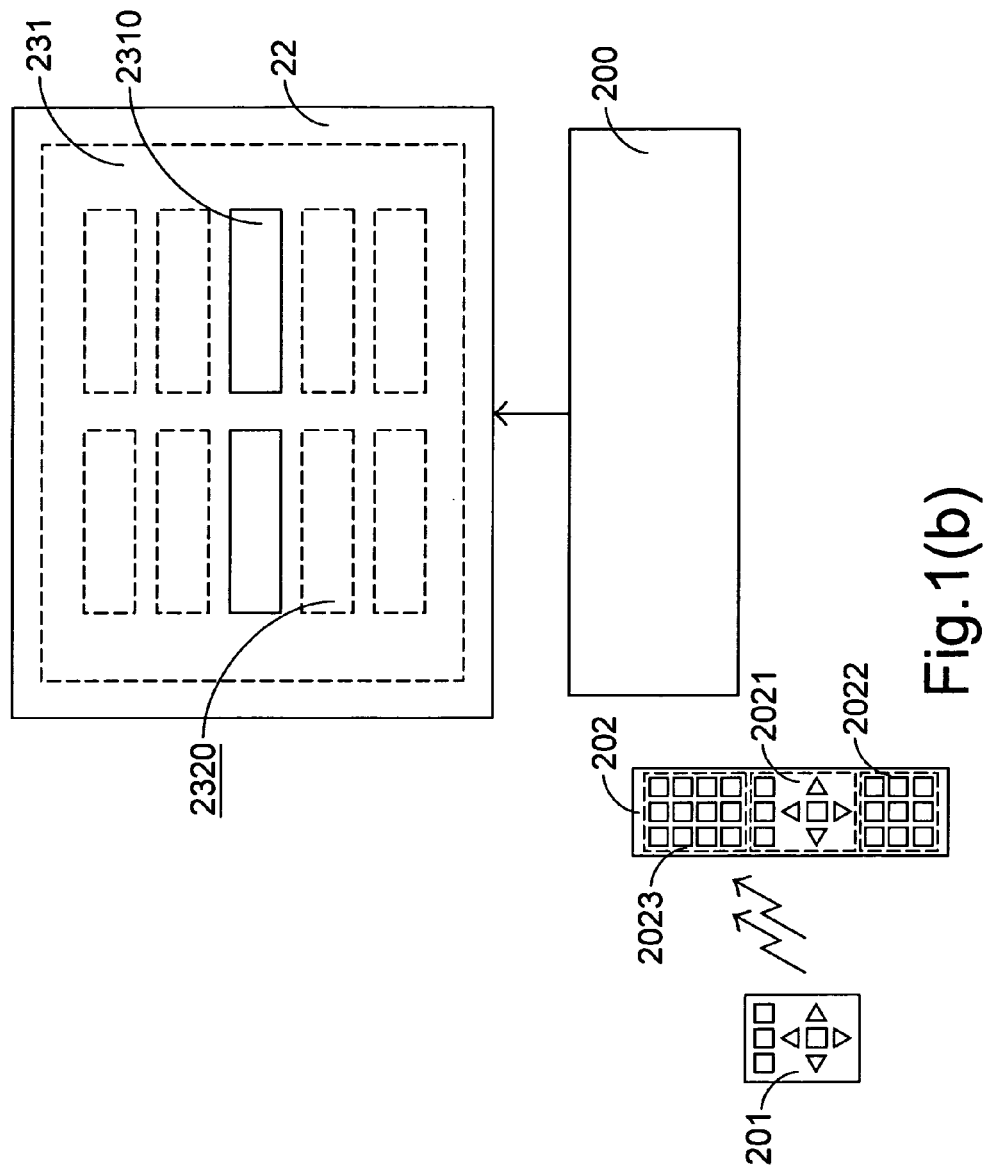

In order to achieve the purpose of adaptive control of an electric appliance, an electric appliance system according to an embodiment of the present invention is illustrated hereinafter with reference to FIGS. 1(a) and 1(b), wherein the electric appliance is operable with multiple user interfaces so that the electric appliance can be selectively controlled in consideration of different needs or different users. In the embodiment of FIGS. 1(a) and 1(b), a DVD player/recorder/rewriter 200 is exemplified as the electric appliance, and a display 22 such as a TV screen or a computer display cooperates with the DVD player/recorder/rewriter 200 for showing video data to be played or showing graphics guiding menus for playback/record control. There are two remote controllers 201 and 202 included in the electric appliance system in addition to the electric appliance 200 and the display 22. The remote controllers 201 and 202 are a simplified remote controller and an all-function remote controller, respectively. Preferably, the remote controller 202 includes all buttons of the remote controller 201, i.e. buttons 2021, and additional buttons 2022 and 2023, and is able to perform all functions of the remote controller 201 and other functions. In other words, the remote controller 202 works in a normal mode, and the remote controller 201 works in a simplified mode or controlled mode. The remote controller 202 is able to perform a group of designated functions that cannot be performed by the remote controller 201.

In the operating example of FIG. 1(a), it is the remote controller 202 working with the electric appliance 200 and the display 22. In response to a command issued from the remote controller 202 by triggering buttons of the remote controller 202 and specifically encoded, the electric appliance 200 selects a corresponding graphics guiding menu 232 including a plurality of selective items 2320 to be shown on the display 22. Then the user may operate one or more of the selective items of the graphics guiding menu 232 to perform designated functions. Of course, the remote controller 202 is also used to activate subsequent graphics guiding menus derived from the graphics guiding menu 232 and control the performance of further designated functions. Via the remote controller 202, complicated functions can be executed following the instructions of the graphics guiding menu 232.

In the operating example of FIG. 1(b), it is the remote controller 201 working with the electric appliance 200 and the display 22. In response to a command issued from the remote controller 201 by triggering buttons of the remote controller 201 and specifically encoded, the electric appliance 200 selects a corresponding graphics guiding menu 231 including a plurality of selective items 2310 to be shown on the display 22. The command issued from the remote controller 201 and the command issued from the remote controller 202 are differentially encoded when the same function is to be controlled so that the electric appliance 200 can discriminate which of the remote controllers is currently triggered and determine which kind of graphics guiding menu should be displayed. As the graphics guiding menu 231 is a simplified guider compared to the graphics guiding menu 232, the selective items 2310 are a part of the selective items 2320, and the other selective items 2320 marked with dash lines are hidden from the graphics guiding menu 231.

The case illustrated in FIG. 1(b) is particularly suitable for those who only need basic control functions, such as a beginner, elder people or children. On the contrary, as the second case illustrated in FIG. 1(a) involves complete and advanced but complicated control, it would be suitable for those skilled in manipulating this electric appliance. Obviously, the remote controller 201 and the graphics guiding menu 231 are easier to be operated by the beginners, elder people or children, but the remote controller 202 and the graphics guiding menu 232 control more functions. Therefore, the two remote controllers 201 and 202 can be selected by different users or in different situations to optionally activate the graphics guiding menus 231 and 232. Giving a DVD recorder as an example, the basic functions may include playback, stop, volume control, etc, and the advanced functions may include quality control or parental control. Since the remote controller 201 has a considerably reduced number of buttons, it can be made compact in size so as to conform to kids' palms.

Although graphics guiding menus shown on a display are used in the above examples for facilitating users' operations, they are not essential to the present invention. Particularly for those skilled in manipulating that electric appliance, the function control can be performed with a remote controller or other types of controllers only without showing any selective items on a display, or performed with the cooperation of a remote controller and literal instructions.

As mentioned above, the commands respectively issued from the remote controllers 201 and 202 are preferably distinguishable. Accordingly, once the electric appliance 200 receives a wireless signal from one of the two remote controllers, which remote controller is currently triggered can be sourced. The distinguishing operation can be performed by firmware. One of the methods is imparting an identification bit to the wireless signal. For example, when the identification bit is "0", the electric appliance 200 determines that the wireless signal comes from the remote controller 201. On the other hand, when the identification bit is "1", the electric appliance 200 determines that the wireless signal comes from the remote controller 202.

Figure 2A:
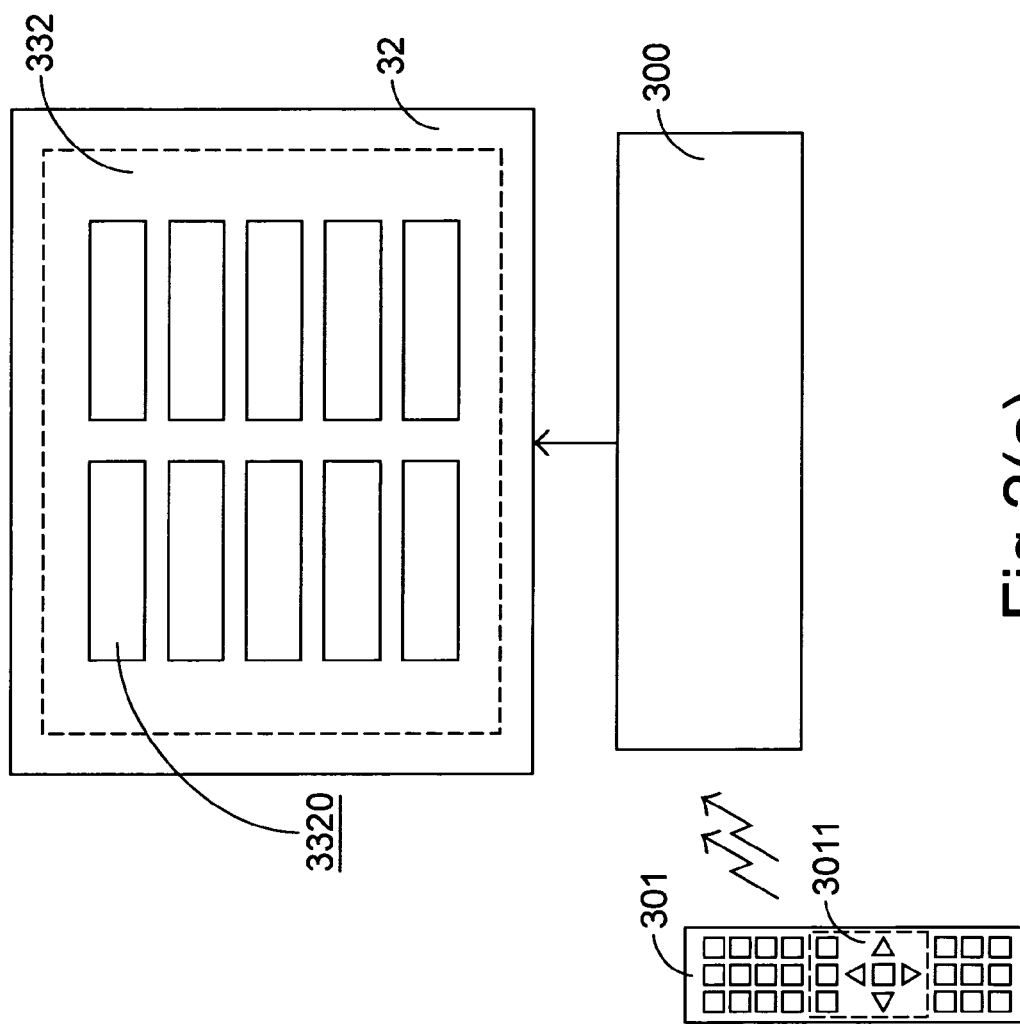
FIGS. 2(a) and 2(b) are schematic diagrams showing another embodiment of an electric appliance system according to the present invention.
Figure 2B:
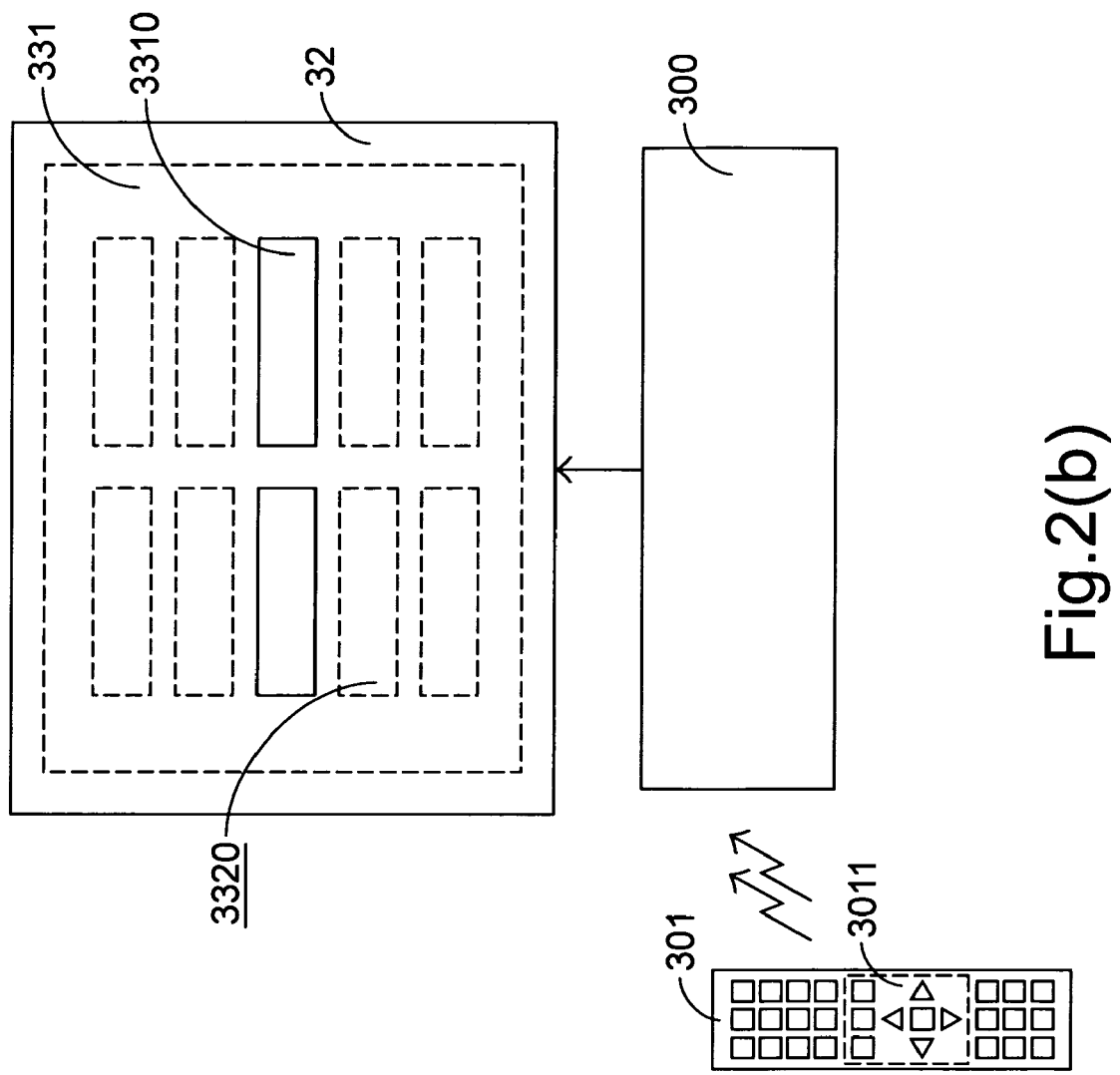

Another embodiment of the present invention for achieving the purpose of adaptive control of an electric appliance is illustrated in FIGS. 2(a) and 2(b), wherein the electric appliance is operated with a single remote controller but selectable graphics guiding menus. The remote controller can be the one used in the embodiment of FIG. 2(a) or any other suitable one.

In this embodiment, an identifying code such as a valid password is requested to show the all-function graphics guiding menu 332 (FIG. 2(a)). If the input password is not valid or incomplete when compared with a preset password, only the simplified graphics guiding menu 331 will be shown (FIG. 2(b)). Likewise, the selective items 3310 of the simplified graphics guiding menu 331 are included in the selective items 3320 of the all-function graphics guiding menu 332. This control method is particularly advantageous when some functions of the electric appliance are to be protected from being arbitrarily activated or some information is to be prevented from being arbitrarily revealed, i.e. in a so-called parental mode.

Figure 3:
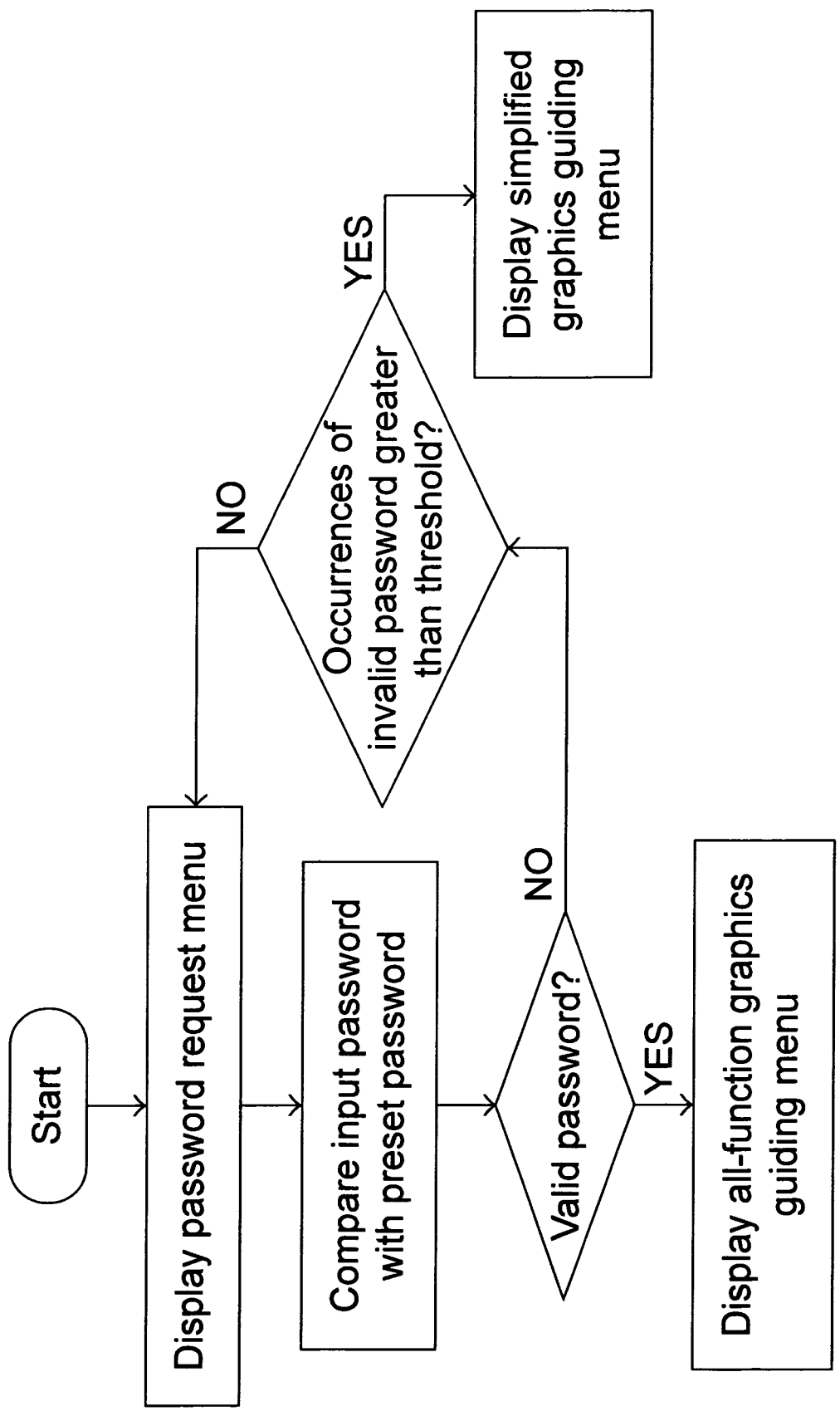
FIG. 3 is a flowchart illustrating a method for controlling an electric appliance according to an embodiment of the present invention.

For reasonable tolerance of input errors, a threshold is preset and a discriminating method shown in FIG. 3 is referred. If the occurrences of invalid or incomplete password do not exceed the threshold, it is allowed to be re-input the password to activate the all-function graphics guiding menu 332. Otherwise, only the simplified graphics guiding menu 331 can be activated.

To sum up, the present invention provides selectable and adaptive control of an electric appliance. The basic and advanced functions can be selectively performed for different users. Accordingly, the basic operation can be done in a simple and efficient way, while the all-function control is still available without bothering the basic users.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for controlling a DVD player/recorder/rewriter, comprising:

receiving an identifying code from a user;

determining a normal mode when said identifying code is valid, and determining a controlled mode when said identifying code is invalid or the input of said identifying code is incomplete;

providing a first graphics guiding menu for performing a first group of designated functions in said controlled mode, and providing a second graphics guiding menu for performing a second group of designated functions in said normal mode, wherein said second graphics guiding menu includes a first selective item for performing a first designated function included in said first graphics guiding menu and a second selective item for performing a second designated function excluded from said first graphics guiding menu; and operating said first graphics guiding menu or said second graphics guiding menu to perform said first group of designated functions or said second group of designated functions.

2. The method according to claim 1 wherein said identifying code is a password inputted via a remote controller.

3. The method according to claim 1 wherein said first graphics guiding menu and said second graphics guiding menu are shown on a display in communication with the DVD player/recorder/rewriter.

4. The method according to claim 3 further comprising a step of showing an identifying code request menu on said display, which is provided for a user to enter said identifying code.

5. The method according to claim 1 wherein said second group includes all designated functions in said first group, and said second graphics guiding menu includes all selective items in said first graphics guiding menu.

* * * * *